US012441590B2

(12) United States Patent
Lorenzen et al.

(10) Patent No.: US 12,441,590 B2
(45) Date of Patent: Oct. 14, 2025

(54) METHOD FOR CONTROLLING A LOAD-HANDLING CRANE, AND LOAD-HANDLING CRANE

(71) Applicant: KONECRANES GLOBAL CORPORATION, Hyvinkää (FI)

(72) Inventors: Daniel Lorenzen, Wetter (DE); Holger Freitag, Bochum (DE); Asaf Topkaya, Wetter (DE); Giuliano Persico, Wetter (DE); Bilal Moussawi, Bochum (DE)

(73) Assignee: Konecranes Global Corporation, Hyvinkää (FI)

(*) Notice: Subject to any disclaimer, the term of this patent is extended or adjusted under 35 U.S.C. 154(b) by 0 days.

(21) Appl. No.: 18/864,791

(22) PCT Filed: Mar. 26, 2024

(86) PCT No.: PCT/EP2024/058065
§ 371 (c)(1),
(2) Date: Nov. 11, 2024

(87) PCT Pub. No.: WO2024/200412
PCT Pub. Date: Oct. 3, 2024

(65) Prior Publication Data

US 2025/0108998 A1 Apr. 3, 2025

(30) Foreign Application Priority Data

Mar. 27, 2023 (DE) ..................... 10 2023 107 645.0

(51) Int. Cl.
*G06F 17/00* (2019.01)
*B66C 13/46* (2006.01)
*B66C 13/48* (2006.01)

(52) U.S. Cl.
CPC .............. *B66C 13/48* (2013.01); *B66C 13/46* (2013.01)

(58) Field of Classification Search
CPC ................................ B66C 13/48; B66C 13/46
(Continued)

(56) References Cited

U.S. PATENT DOCUMENTS 6,386,513 B1 * 5/2002 Kazerooni ............ B66C 1/0256 254/270
7,185,774 B2 3/2007 Works
(Continued)

FOREIGN PATENT DOCUMENTS

CN 1684901 A 10/2005
CN 111247082 A 6/2020
(Continued)

OTHER PUBLICATIONS

Crane control (Year: 2011).*

*Primary Examiner* — Ronnie M Mancho
(74) *Attorney, Agent, or Firm* — Gardner, Linn, Burkhart & Ondersma LLP

(57) ABSTRACT

A method for controlling a load-handling crane, to the load-bearing means of which a handling device is secured, wherein a sensor system ascertains position data of a part secured to the load-bearing means, and a controller is connected to the sensor system in a signal-transmitting manner and is configured to specify, on the basis of the position data, a travel direction for a control command, generated by the controller, for at least one travel drive of the crane, in particular a trolley drive and/or a crane drive.
The aim of the invention is to increase efficiency and ergonomics during load-handling operation. This aim is achieved in that at least one identification feature is attached to the handling device, and the at least one marking element is detected by the sensor system, and is analyzed.
The invention also relates to a load-handling crane configured to perform such a method.

14 Claims, 4 Drawing Sheets

Figure 1:
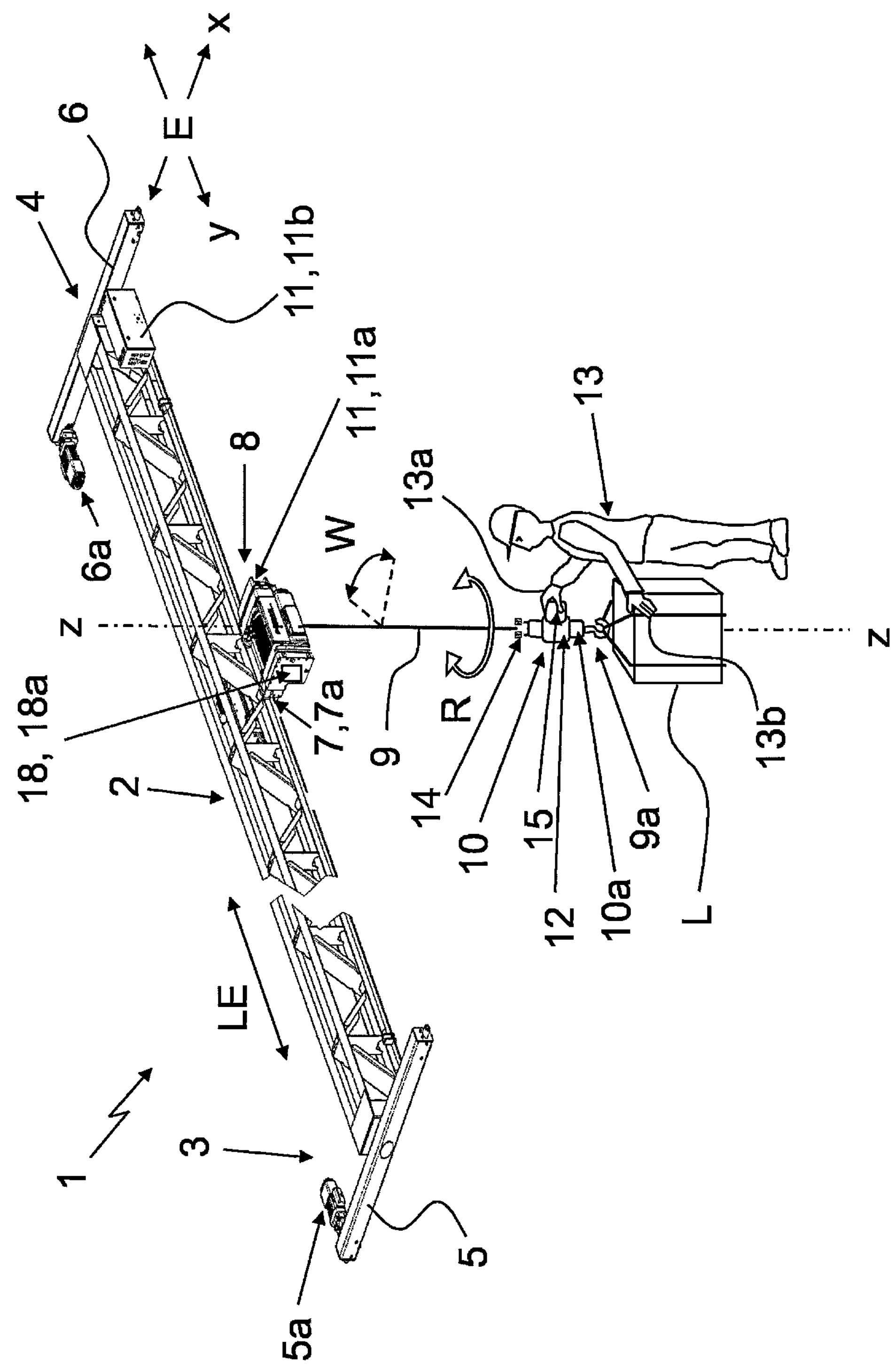

(58) Field of Classification Search
USPC ........................................................ 701/50
See application file for complete search history.

(56) References Cited

U.S. PATENT DOCUMENTS

| | | | | |
|---|---|---|---|---|
| 11,208,301 | B2 * | 12/2021 | Krebs .................... | G08C 17/02 |
| 2009/0020492 | A1 | 1/2009 | DeVos | |
| 2021/0188600 | A1 * | 6/2021 | Freitag .................... | B66C 13/44 |

FOREIGN PATENT DOCUMENTS

| | | | | | |
|---|---|---|---|---|---|
| DE | 202012012116 | U1 | 3/2014 | | |
| DE | 102023107645 | A1 * | 10/2024 | ............. | B66C 13/18 |
| EP | 1501754 | B1 * | 11/2008 | ............. | B66C 17/00 |
| EP | 3 323 767 | A1 | 5/2018 | | |
| WO | 2004031068 | A1 | 4/2004 | | |
| WO | WO-2012001748 | A1 * | 1/2012 | ............. | B66C 13/16 |
| WO | 2019077054 | A1 | 4/2019 | | |

* cited by examiner

METHOD FOR CONTROLLING A LOAD-HANDLING CRANE, AND LOAD-HANDLING CRANE

The invention relates to a method for controlling a load-handling crane according to the preamble of claim 1 and to a load-handling crane according to the preamble of claim 10.

Cranes are generally used to lift and lower loads at different locations within the respective crane working area. For this purpose, a crane's hoist is moved by means of its travel drives (crane drive and trolley drive) in a usually horizontal travel plane (xy-plane), provided that an operator generates corresponding control commands for the corresponding travel drive by actuating a handling device of the crane designed, for example, as a control switch, and thereby initiates corresponding crane movements and thus controls the crane. For this purpose, control switches have operating elements as an interface between an operator and the crane, which operating elements can be actuated by an operator in order to generate the corresponding control commands for the corresponding travel drive and a lifting drive of the crane or hoist. In addition, corresponding control switches or the operating elements, a controller of the crane as well as the drives (travel drives and lifting drive) are connected to one another in a signal-transmitting manner in order to be able to control the drives by means of the control commands and in order for this purpose to be able not only to generate the control commands but also to transmit them for the purpose of converting them into the corresponding movement. The control switch can be designed as a remote control for wireless signal transmission or as a pendant control switch, which is suspended from a signal transmission cable also referred to as a control line, for wired signal transmission.

While the handling device in the form of the control switch in the aforementioned conventional cranes is provided outside the so-called load strand and thus outside the liftable and lowerable load-bearing means of the crane or the hoist thereof, a handling device optionally designed as a control switch in so-called load-handling cranes in the sense of the present invention is likewise secured to the load-bearing means and thus to the load strand, usually above a load-carrying means suspended from the hanging free end of the load-bearing means. In particular, the load-carrying means can also be secured to the load-bearing means exclusively via the handling device so that the handling device is load-bearing and thus secured to the load-bearing means as part of the load strand. Securing the handling device to the load-bearing means or load strand makes it possible, unlike in the aforementioned conventional cranes, for an operator to actuate or manipulate the handling device with one hand and at the same time with the same hand both to trigger control commands for the crane or the drives thereof and to manually dampen pendulum movements of the load-bearing means and any load secured to the load-carrying means and to guide the load.

A method according to the preamble of claim 1 and a load-handling crane according to the preamble of claim 10 are known from WO 2019/077054 A1. This document mentions generic load-handling cranes that can be controlled by ascertaining the deflection direction of the load-bearing means relative to the direction of the gravitational force via a sensor system, or by ascertaining the alignment of the control switch secured to the load-bearing means in the form of a rotation angle via a rotation angle sensor system integrated into the control switch, and interpreting this as the desired travel direction of the hoist in each case so that control commands for the crane's travel drive are generated and converted by the travel drive into a movement of the hoist into a travel direction corresponding to the deflection direction of the load-bearing means or the rotation angle of the control switch. It is also known from this document that, in order to ascertain the alignment, distinguishable reference points can be measured, which are defined, for example, in the form of light sources on the load-bearing means or on the handling device of the crane.

U.S. Pat. No. 7,185,774 B2 discloses a method in which the alignment of a load is ascertained, for which purpose high-contrast marking elements or lights of different colors are detected.

Optical detection of marking elements is known from DE 20 2012 012 116 U1 with respect to a rotating tower crane and from EP 3 323 767 A1 with respect to a mobile crane.

Against this background, the present invention is based on the object of increasing the efficiency and ergonomics of a generic method for controlling a load-handling crane and of a corresponding load-handling crane during load-handling operation.

This object is achieved by a method with the features of claim 1 and by a load-handling crane with the features of claim 10. Advantageous embodiments of the invention are given in the dependent claims and the following description.

The invention now improves a method for controlling a load-handling crane, to the load-bearing means of which a handling device for an operator is secured, wherein a sensor system ascertains position data of at least one part secured, i.e., attached, to the load-bearing means, and a controller is connected to the sensor system in a signal-transmitting manner and is configured to specify, on the basis of the position data ascertained by the sensor system, a travel direction, in particular in the sense of a direction target value, for a control command, generated by the controller, for at least one travel drive, in particular a trolley drive and/or crane drive, of the crane.

The load-bearing means can be part of a hoist of the crane, which has a lifting drive for lifting and lowering the load-bearing means, including any load hanging therefrom and can be moved via the crane trolley along a crane girder in a trolley travel direction (y direction) on a preferably horizontal travel plane. The crane trolley can be equipped with the trolley drive for this purpose. Via the crane drive, the crane girder, together with the crane trolley carrying the hoist, can be moved in a crane travel direction (x direction) perpendicular to the trolley travel direction. By means of the corresponding travel drive, the hoist can thus be moved in each case in the crane travel direction (x direction) and/or the trolley travel direction (y direction) independently of each other and thus in the travel plane formed thereby (xy-plane). The crane travel direction or trolley travel direction, either individually or in combination through their superposition, result in the resulting travel direction of the crane and in particular of the hoist thereof in or parallel to the travel plane.

The handling device is preferably attached to a portion of the load-bearing means hanging down from the travel plane, in particular to the free end thereof, above a load-carrying means suspended from the load-bearing means. By grasping the handling device, an operator can, in particular with one hand and at the same time with the same hand, manually guide, rotate and align the load-bearing means and any load hanging therefrom as well as manually dampen pendulum movements of the load-bearing means and the load.

The load-bearing means itself may be rigid, for example as an in particular telescopic rod, or flexible, for example as a rope or chain. It may also be provided that the handling device, in particular the housing thereof, is designed to be arranged on and secured to the load-bearing means in a load-bearing manner between the portion of the load-bearing means and the load-carrying means. As a result, the handling device, like the load-carrying means, becomes a part of the load strand of the hoist that extends the load-bearing means and through which load forces originating from a load secured to the load-carrying means are introduced into the load-bearing means via the handling device, in particular the housing thereof. Accordingly, the load-carrying means can be secured to and suspended from the handling device, in particular the housing thereof, and thus via the handling device to/from the load-bearing means. This makes it possible to easily switch between different load-carrying means, such as load hooks, grippers, etc., by providing a receptacle on the handling device, or the housing thereof, for detachably securing the corresponding load-carrying means. The handling device and in particular the housing thereof can thus be designed and connectable to the load-carrying means in such a way that a movement and in particular deflection and/or rotation of the handling device effects a movement of the same kind, in particular to the same extent, of at least the load-carrying means, possibly including any load secured thereto, and vice versa.

The improvement according to the invention of the method for controlling such a load-handling crane is now achieved in that at least one, in particular optical, marking element, which has at least one predefined, in particular unique, identification feature, is attached to the load-bearing means, in particular to the handling device, and, in order to ascertain the position data, the at least one marking element is detected by the sensor system and the at least one predefined, in particular unique, identification feature of the marker element that has been detected is analyzed, preferably also by the sensor system and/or the controller. The marking element(s) are each attached at predefined positions in order to be able to ascertain unambiguous position data, because the marking element(s) and their at least one predefined, in particular unique, identification feature uniquely mark and thus define, for example, a front side and/or rear side and/or left side and/or right side. Each marking element thus serves as an orientation mark and/or position indicator. By specifically providing the marking element with an identification feature and analyzing it, it is thus also possible, in particular due to its uniqueness, to unambiguously ascertain the orientation or position from the position data.

In contrast, the measurement of reference points or marking elements without identification features, as in the aforementioned prior art, does not allow for unambiguously ascertaining the orientation or position, since the recognition of two marking elements, for example, does not make it clear which of the two is at the front or rear or right or left. In other words, by specifically providing and/or analyzing an identification feature, it is now possible to unambiguously identify each marking element and thus to do more than just distinguish between reference points numerically and measure them.

In this case, it may be provided that the at least one marking element is a passive marking element, preferably in the form of a 2D code, which in particular includes the identification feature(s), in particular unique identification feature(s) in each case. The at least one marking element can also be an active marking element, which in particular actively sends the identification feature(s), in particular unique identification feature(s) in each case, to the sensor system and is received thereby. The active marking element is in this case preferably designed as a transmitter emitting electromagnetic radiation, in particular infrared radiation, for example as an IR diode. Lasers or other light sources may also be used as active marking elements.

The at least one predefined, in particular unique, identification feature can be integrated into the corresponding marking element when generating such a marking element, in particular when creating passive marking elements, such as 2D codes. The at least one predefined identification feature may also be or comprise an inherent property of the corresponding marking element, for example a wavelength or a wavelength range in the case of an active marking element in the above sense.

It is also conceivable that, for the detecting sensor system, the predefined identification feature(s) in encoded form are stored in a passive marking element or are sent from an active marking element to the sensor system. The at least one marking element can thus in particular be encodable.

According to the invention, the at least one part secured to the load-bearing means, the position data of which are ascertained by the sensor system, is thus one or more marking elements. In particular, passive marking elements, such as 2D codes, can in each case be particularly easily attached in the form of or by means of a sticker. The part secured to the load-bearing means, the position data of which are ascertained within the scope of the method according to the invention, is thus different from any load hanging on the load-bearing means. The orientation or position ascertained from the position data can thus also be different from the orientation or position of the load, for example if a rotating element is provided between the at least one marking element and the load.

Preferably, it is provided that the position data include or represent a position of the corresponding marking element, secured to the load-bearing means and thus suspended like a pendulum, in the form of a direction, in particular alignment, and/or a position as well as the changes thereof and thus also corresponding movements and movement directions. Accordingly, the ascertained position data of the corresponding marking element represent, for example, deflections and associated deflection directions and/or deflection angles relative to an imaginary vertical axis when moving out of the gravity-driven rest position. Alternatively or additionally, the ascertained position data of the corresponding marking element represent rotation angles during a rotation, in particular a deflection-free rotation, about such a vertical axis or a corresponding separate rotation axis, in particular longitudinal axis, of the load-bearing means and/or of the handling device which bear(s) the corresponding marking element. The position data, which represent the corresponding positions or position changes, are ascertained in each case at least relative to the travel plane (xy-plane) of the hoist or crane, i.e., in particular, the corresponding coordinates in relation to the crane travel direction (x direction) and the trolley travel direction (y direction), optionally also in relation to a z direction. Ascertaining the position data may also include first ascertaining a reference position, in particular a predefined position of the marking element at least in relation to the xy-plane, wherein the position of the sensor system relative thereto is also known.

Since, during crane operation when controlling a load-handling crane, the handling device in particular can be grasped and guided particularly precisely by the operator in a crane-type-related manner and its position can thus be influenced according to a desired travel direction, it is advisable to attach the corresponding marking element to the handling device, preferably the housing thereof and in particular the preferably flat and ring-shaped housing top side thereof, whereby any position changes of the marking element take place uniformly. Alternatively, it is also conceivable that, for attaching the at least one marking element, a holding part, which is connected to the handling device in a rotationally fixed manner and is preferably flat and ring-shaped, is provided above the housing top side. Attaching the corresponding marking element to the housing top side or a corresponding holding part ensures that the marking element is attached in an exposed position in the detection range of the sensor system and can thus be reliably detected.

Each marking element represents or defines at least one absolute reference point, which can be reliably and unambiguously detected by the sensor system as part of ascertaining the position data and can subsequently be analyzed by the sensor system and/or the controller, in particular as bijective position information.

It is also conceivable that a marking element not only serves as an optical marking of a reference point but also contains sufficient data on its own to be able to ascertain unambiguous position data, at least in relation to or in coordinates of the travel plane (xy-plane). Such data can, for example, represent at least two reference points that are clearly defined in their position relative to one another and are in particular immobile relative to one another, or a type of direction vector. For particularly reliably and unambiguously ascertaining the position data, a plurality of marking elements may also be provided for redundancy. This also increases failure safety since the position data required to control the load-handling crane can be reliably ascertained even if one of the marking elements cannot be detected, for example because it is dirty, concealed or the line of sight between the sensor system and the corresponding marking element is otherwise interrupted. For this purpose, before being attached, each marking element is specifically created or selected such that it contains at least one predefined, and in particular unique, identification feature, which is analyzed by the sensor system and/or controller in order to ascertain the position data and ensures, in particular in the case of a plurality of marking elements, that the latter can be distinguished from one another.

The sensor system comprises at least one optical sensor, preferably at least one camera, and the at least one optical sensor is preferably attached above the at least one marking element to the crane, preferably to the hoist. The optical sensor can thus be moved together with the hoist by means of the travel drive, whereby the corresponding marking element remains in the detection range, extending in particular below the sensor system and thus in the direction of the handling device, of the sensor system during each crane movement.

The position data are preferably ascertained with the aid of a computer, in particular with the involvement of suitable software, in order to be able to analyze the data contained in the detected marking element, in particular also the identification feature(s) of the corresponding marking element. If a 2D code is used as a marking element, it can advantageously be a so-called AprilTag. In comparison to QR codes, AprilTags for type-related reasons include, for example, less data and/or a smaller number of pixels, which makes it possible to analyze and ascertain the position data more quickly, in particular in real time.

In order to specify and thus set the desired travel direction, the operator can manually influence the position of at least one marking element, which is reflected in the ascertained position data and thus affects the specification of the travel direction for the control command of the travel drive.

For example, the operator can influence the position of the marking element by deflecting the load-bearing means, the handling device secured thereto, and/or any load itself since the marking element is attached to one of the aforementioned parts and thus directly or indirectly to the load-bearing means. The deflection can, for example, be effected by pulling or pushing at least one of the aforementioned parts. As an alternative or in addition to the deflection, rotation about a rotation axis is also possible, which may coincide with the imaginary vertical axis, in particular in the gravity-driven rest position. This results in a steering function of the load-handling crane that is comparable to turning a bicycle handlebar or steering wheel. The position of the at least one marking element can thus be manipulated in a uniform and specific manner according to the movement or position change, manually induced by the operator, of the part to which the corresponding marking element is attached.

The position data ascertained in this way are used to interpret the travel direction desired by the operator, by then specifying and/or changing, on the basis of the ascertained position data, the travel direction for the control command for controlling the corresponding travel drive. This may, for example, be done in such a way that the specified travel direction corresponds to the ascertained movement direction of the marking element in relation to the xy-plane, i.e., in x and y coordinates, which results when the load-bearing means is deflected from the gravity-driven rest position, in particular relative to the imaginary vertical axis. It is also conceivable, for example, as part of the aforementioned steering function, that a predefined or fixed straight-ahead direction assigned to the corresponding marking element is aligned to the desired travel direction by corresponding rotation about the rotation axis.

The operator can thus intuitively control the travel direction without having to actuate a dedicated direction button.

Unintentional travel movements of the crane can advantageously be prevented in that the control command for the corresponding travel drive is generated and/or converted into a travel movement of the crane only if, in particular not until and/or as long as, a hand recognition sensor of the handling device recognizes at least the presence of an operator. A dead man's switch function can thus be provided, which requires that one hand must be on the handling device and that the handling device must not be released if and for as long as travel movements of the crane are to be initiated. The hand recognition sensor may, for example, comprise a capacitive touch sensor or an optical sensor, in particular a reflex barrier or light barrier, but also a sensing device, in particular an electromechanical one. In the case of such a sensing device, its continuous actuation may also be necessary and not just the presence of an operator or the touch of a hand.

Advantageously, it may also be provided that the travel direction for the control command is specified and/or changed by means of a position change of the marking element that has been detected, and the position data ascertained for this purpose, and thus also on the basis of these position data, in particular as a result of a movement of the load-bearing means and/or of the handling device, and thus of the corresponding marking element attached thereto. The aforementioned position changes can be recorded via the marking element that has been detected, and corresponding position data reflecting or representing the position change can be ascertained. In particular, it may be provided that a position change must occur in order to specify the travel direction for the control command and optionally also to generate the control command with this travel direction by means of this position change, for example in connection with the "deflection" operating mode described in more detail below.

Alternatively or additionally, it may be provided that the travel direction for the control command is specified by actuating an operating element of the crane, in particular that an operating element must be actuated in order to specify the travel direction.

The operating element is preferably designed as a mechanically actuated, in particular spring-loaded, operating element, preferably in the form of a joystick. As an alternative or in addition to a joystick, an operating element designed as a button, for example a push button or toggle button, may also be provided. In this case, the corresponding operating element is preferably arranged on the handling device and in particular on the housing thereof, whereby the latter is then designed as a control switch.

A plurality of operating elements may also be provided, in particular buttons in pairs or a joystick for each travel drive (crane drive or trolley drive) or lifting drive, in order in each case to specify opposite movement directions of the corresponding drive in the sense of forward travel and reverse travel or in the sense of lifting and lowering movements. Control commands for the travel drive with a correspondingly specified travel direction can also be generated by actuating the corresponding operating element. If the actuation of an operating element is thus necessary to generate the control command, the travel direction can be specified and the associated control command, optionally including the specification of a speed target value, can be triggered by actuating the same operating element, for example with the same actuation, one actuation each or via dedicated actuation levels. Separate operating elements for generating the control command and specifying the travel direction as well as, optionally, a speed target value are also conceivable.

In other words, it may be provided that the hoist can be or is moved in a specified travel direction on the travel plane by means of the travel drive only by actuating the corresponding operating element, wherein the travel direction is specified on the basis of the position data, ascertained by means of the sensor system, of the corresponding marking element. This significantly increases the safety of load handling since the required actuation in the sense of a safety function prevents, for example, a deflection of the load-bearing means with a marking element attached thereto from being immediately converted into a travel maneuver effected by the travel drive in a possibly unintentional travel direction. Instead, the required actuation of an operating element makes it possible for an operator to first change the position of the marking element according to the desired travel direction. Only by actuating the operating element is in this case the travel direction specified and/or the actual control command for controlling the travel drive generated, by which the travel movement is started and the hoist is moved in the travel direction dependent on the ascertained position data, wherein the position data were previously influenced by the position change. In addition, it can thus be prevented that position changes of the marking element, which are carried out, for example, to manually dampen any pendulum movements of the load-bearing means via corresponding manipulations of the handling device, are falsely interpreted as the supposedly intended generation of a control command or a travel movement.

Advantageously, it may also be provided that the sensor system continuously ascertains the position data, i.e., also continuously represents or reflects position changes, and interacts with the controller in such a way that the specified travel direction is continuously changed during the movement of the crane or the corresponding travel drive thereof on the basis of the ascertained position data, in particular during the ongoing travel movement(s) and without stopping the travel drive ("on the fly").

If the actuation of an operating element is necessary to specify the travel direction, it may be provided that the specified travel direction is only continuously changed if the operating element to be actuated to specify the travel direction is continuously actuated and, in the meantime, position data are ascertained which reflect a change in the position, in particular in the direction or alignment, of the at least one marking element.

In an advantageous embodiment of the method, it is provided that the control command for the corresponding travel drive is generated according to a "deflection" operating mode of the crane by means of a position change of the at least one detected marking element and the position data ascertained for this purpose, wherein a speed target value for the corresponding travel drive is preferably also specified and/or changed, which is also dependent on the position data ascertained for the position change, in particular on the dimension or amount of a deflection angle or a movement amplitude in the direction of a crane travel direction and/or trolley travel direction, i.e., in particular in relation to the xy-plane.

The marking element that has been detected can thus be used to record its position changes, in particular in the aforementioned form, and to ascertain corresponding position data reflecting or representing the position change, in order to subsequently generate the control command for the corresponding travel drive, in particular without having to actuate an operating element of the crane, as provided, for example, for the "rotation" operating mode described below. As a position change, it may then be sufficient, for example, to pull or push the handling device or the control switch into the desired travel direction and thereby effect a mere deflection of the marking element, in particular without the need for a rotation in the above sense. In connection with the "deflection" operating mode, it may also be provided that predefined position data, which, for example, correspond to such a deflection, must be ascertained in order to generate the control command. It may also be provided that no control command is generated when ascertaining predefined position data, for example in the case of position data that only represent a deflection-free rotation in the above sense.

The corresponding position change for generating the control command can thus coincide with the position change for specifying and/or changing the travel direction, so that, as a result of the same movement or position change, both the travel direction is specified and/or changed and the control command with the correspondingly specified travel direction, optionally including the specification of a speed target value, is generated and in particular converted into a corresponding travel movement of the crane.

With respect to the travel drives, in a minimum configuration for the "deflection" operating mode, control commands for all movement directions of the travel plane can thus already be realized with a handling device without an operating element for the corresponding travel drive, since only corresponding position changes of at least one marking element have to be effected and detected or recorded for this purpose.

According to a further advantageous embodiment of the method, it is provided that the control command for the corresponding travel drive is generated according to a "rotation" operating mode of the crane by actuating an operating element of the crane, in particular of the handling device, which is thus optionally designed as a control switch. The control command as such can thus be generated in particular without having to additionally effect a position change of the at least one marking element or ascertain corresponding position data for this purpose, in particular before actuating the operating element, wherein a speed target value for the travel drive is preferably also specified by actuating the operating element. The actuation path of the operating element can be used as a measure for specifying the speed target value, wherein the actuation path and thus also the speed target values can be specified continuously or in steps.

In connection with the "rotation" operating mode, it may be provided that the operating element must be actuated in order to generate the control command for the corresponding travel drive, for which the travel direction is then specified on the basis of unchanged position data, in particular an unchanged alignment or an unchanged rotation angle. It may also be provided that a control command is generated by actuating the operating element even if position data are ascertained which are not sufficient to generate a control command in the "deflection" operating mode, for example position data which only correspond to a deflection-free rotation in the above sense.

With respect to the operating element, the statements regarding the operating element for specifying the travel direction apply analogously. This may be the same operating element, in particular the same joystick or the same button, as the operating element to be actuated to specify the travel direction and optionally the speed target value. The actuation for generating the control command for the travel drive and for specifying the travel direction and, optionally, a speed target value can thus coincide. Separate operating elements for generating the control command and specifying the travel direction as well as, optionally, a speed target value are also conceivable.

With respect to the travel drives, in a minimum configuration for the "rotation" operating mode, control commands for all movement directions of the travel plane can thus be realized with a single operating element since only corresponding position changes of at least one marking element have to be effected for this purpose, wherein deflection-free rotations in the above sense are in particular sufficient and tiring movement out of the gravity-driven rest position for a deflection is not necessary in order to use correspondingly ascertained position data to specify the corresponding travel directions for the control commands then generated by actuating the operating element. For example, a deflection-free 180° rotation of the marking element about the imaginary vertical axis can then be effected between two actuations of the operating element in order to generate a control command with the opposite travel direction for the travel drive by the second actuation of the operating element.

Furthermore, the method can be designed such that the "rotation" operating mode and/or the "deflection" operating mode are each activated exclusively for predefined applications, which can in particular be defined by parameterization or by predefined load ranges, wherein the "rotation" operating mode can preferably be activated in the sense of a heavy-duty travel function for loads above a predefined load value and the "deflection" operating mode can preferably be activated in the sense of a light-duty travel function for loads below the predefined load value. For activating the light-duty travel function and/or the heavy-duty travel function in the sense of a change of operating mode, a load sensor system of the crane, in particular of the hoist, can in this case be used to ascertain the current load. For this purpose, a load sensor can, for example, be arranged in the load strand, in particular on the load-bearing means itself or in or on the housing of the handling device. For realizing a load sensor system, the current load may also be ascertained from operating data of the hoist, for example a motor current. However, it may also be provided, in particular by appropriate parameterization, that basically only one of the operating modes "rotation" or "deflection" is activated, in particular regardless of the ascertained load value, wherein the corresponding operating mode can or must in this case be activated manually by an operator.

The controller may be arranged at least partially on or in the handling device and in particular within the housing thereof. The controller may also be used to control the lifting drive of the hoist by actuating a corresponding operating element on the handling device, which is thus designed as a control switch. Alternatively, the controller may also be arranged at least partially outside the handling device. The controller may therefore also be divided, for example so that a part of the controller that serves to control the trolley drive for movement in the trolley travel direction is arranged as a trolley control on the crane trolley, and a part of the controller that serves to control the crane drive for movement in the crane travel direction is arranged as a crane control outside the crane trolley on the crane girder or at least one of the crane carriages. The trolley control can then also control the lifting drive.

The components required for performing the method according to the invention and the optional embodiments thereof, such as the controller or the parts thereof, the sensor system for ascertaining the position data, as well as the optional components, such as the operating element(s) of the handling device, which is then designed as a control switch, hand recognition sensor and load sensor, are each configured for a signal-transmitting connection to one another and are at least partially connected to one another. This ensures the transmission of signals, which correspond at least to the ascertained position data, the specified target values, in particular the travel directions specified in each case as direction target values, and/or speed target values, and/or control commands with such target values for the travel drive and lifting drive, between the components involved in each case. The signal transmission between the aforementioned components may be wireless, for example via radio or infrared, or wired via appropriate signal transmission cables, in particular control lines.

In connection with the aforementioned, in particular deflection-free, rotations, it may be provided that the handling device has a rotating element as an alternative to securing to the load-bearing means in a rotationally fixed manner. Via the rotating element, the handling device can be secured to the load-bearing means so that it can rotate relative to the load-bearing means and about the imaginary vertical axis or its own rotation axis, in particular longitudinal axis, in order to prevent torsion of the load-bearing means and a resulting reverse torque. The rotating element may, for example, have rolling bodies, in particular an axial bearing designed as a rolling bearing.

According to a further aspect of the invention, a load-handling crane, to the load-bearing means of which a handling device for an operator is secured, wherein the crane has a sensor system for ascertaining position data of a part secured, i.e., attached, to the load-bearing means, and a controller of the crane is connected to the sensor system in a signal-transmitting manner and is configured to specify, on the basis of the position data ascertained by means of the sensor system, a travel direction for a control command, generatable by the controller, for at least one travel drive of the crane, in particular a trolley drive and/or a crane drive, is improved in that at least one marking element is attached to the load-bearing means, preferably to the handling device, in order to be detected by the sensor system in order to ascertain the position data, and wherein the sensor system and/or the controller are configured to analyze at least one predefined identification feature of the marking element that has been detected, in particular to perform a method according to one of the preceding claims.

The statements regarding the method and the components required for said method thus apply equally to the load-handling crane equipped and configured with the corresponding components to perform the method. The resulting advantages have also already been explained in more detail in connection with the method according to the invention, which is also referenced at this point.

Figure 2A:
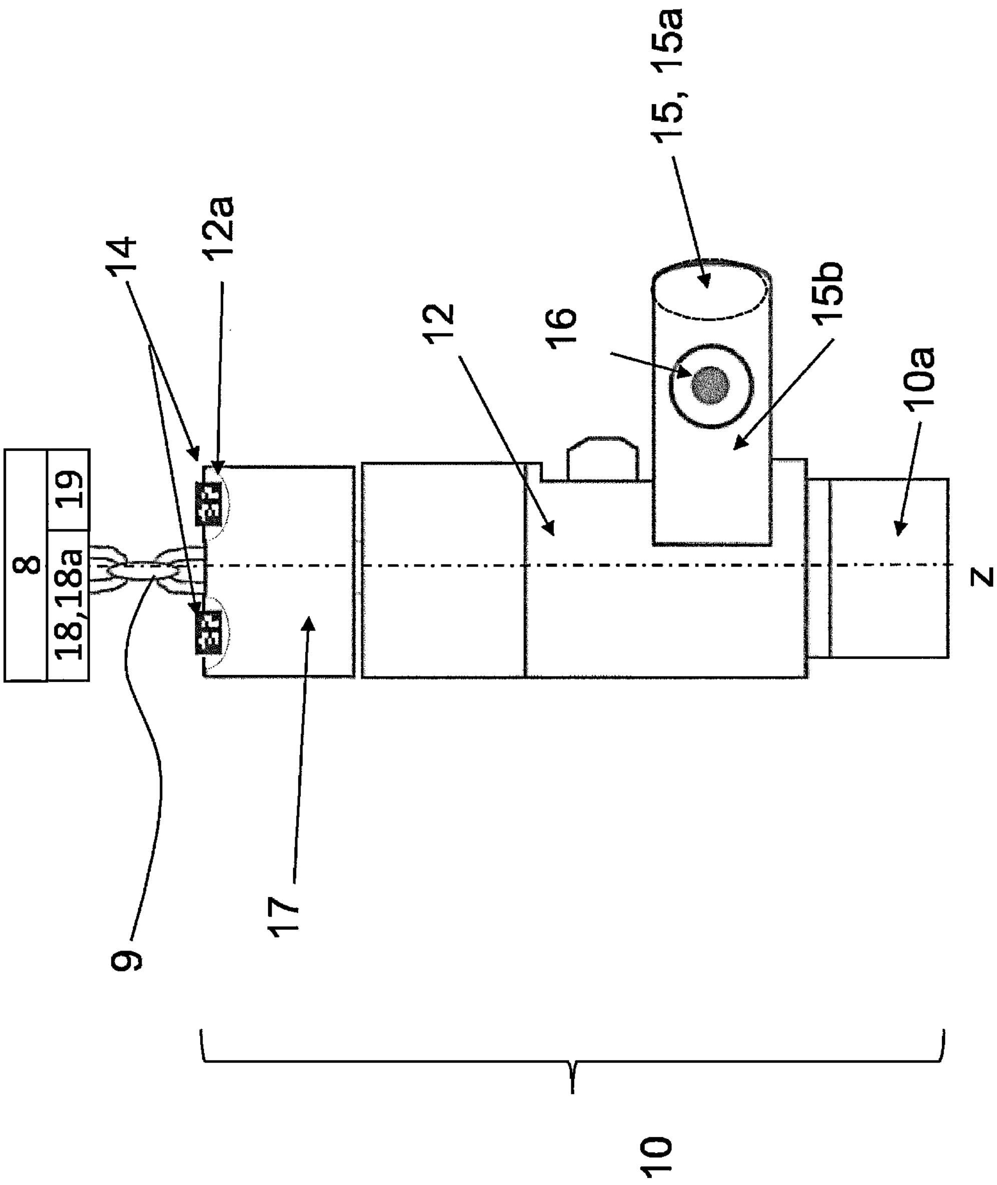
Figure 2B:
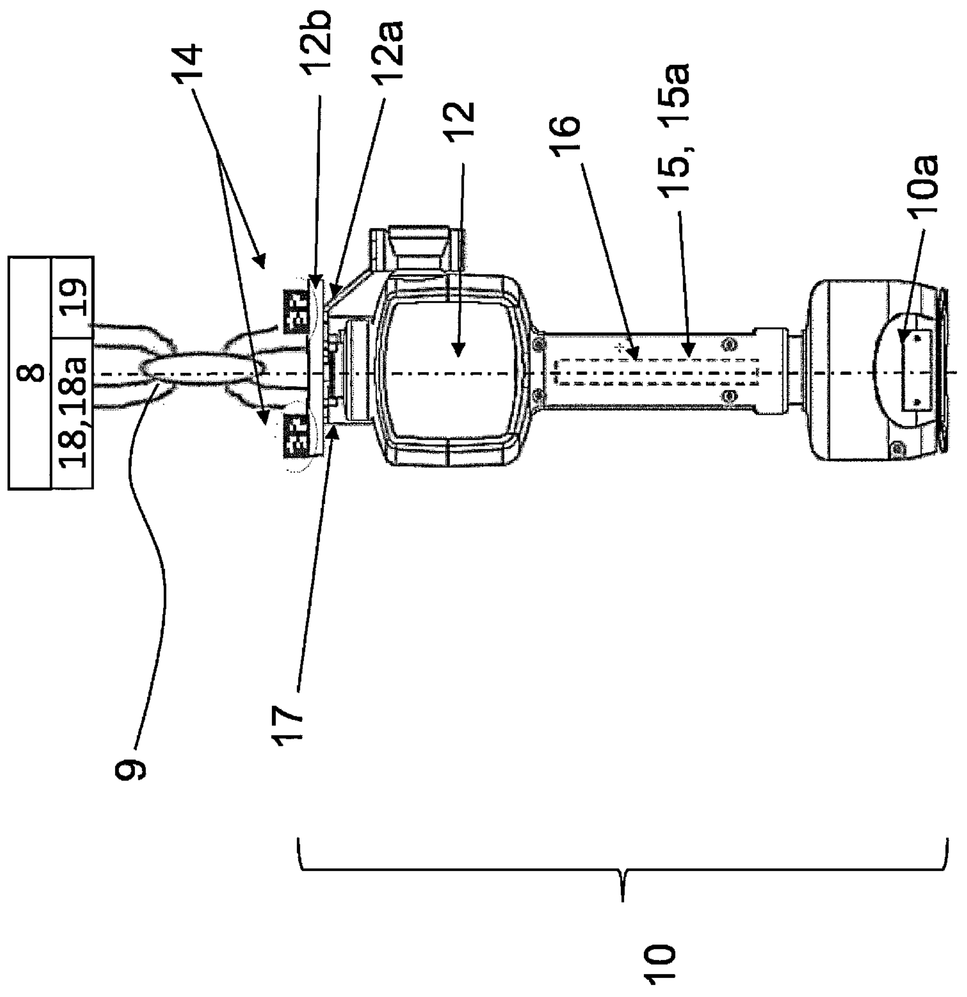
Figure 3:
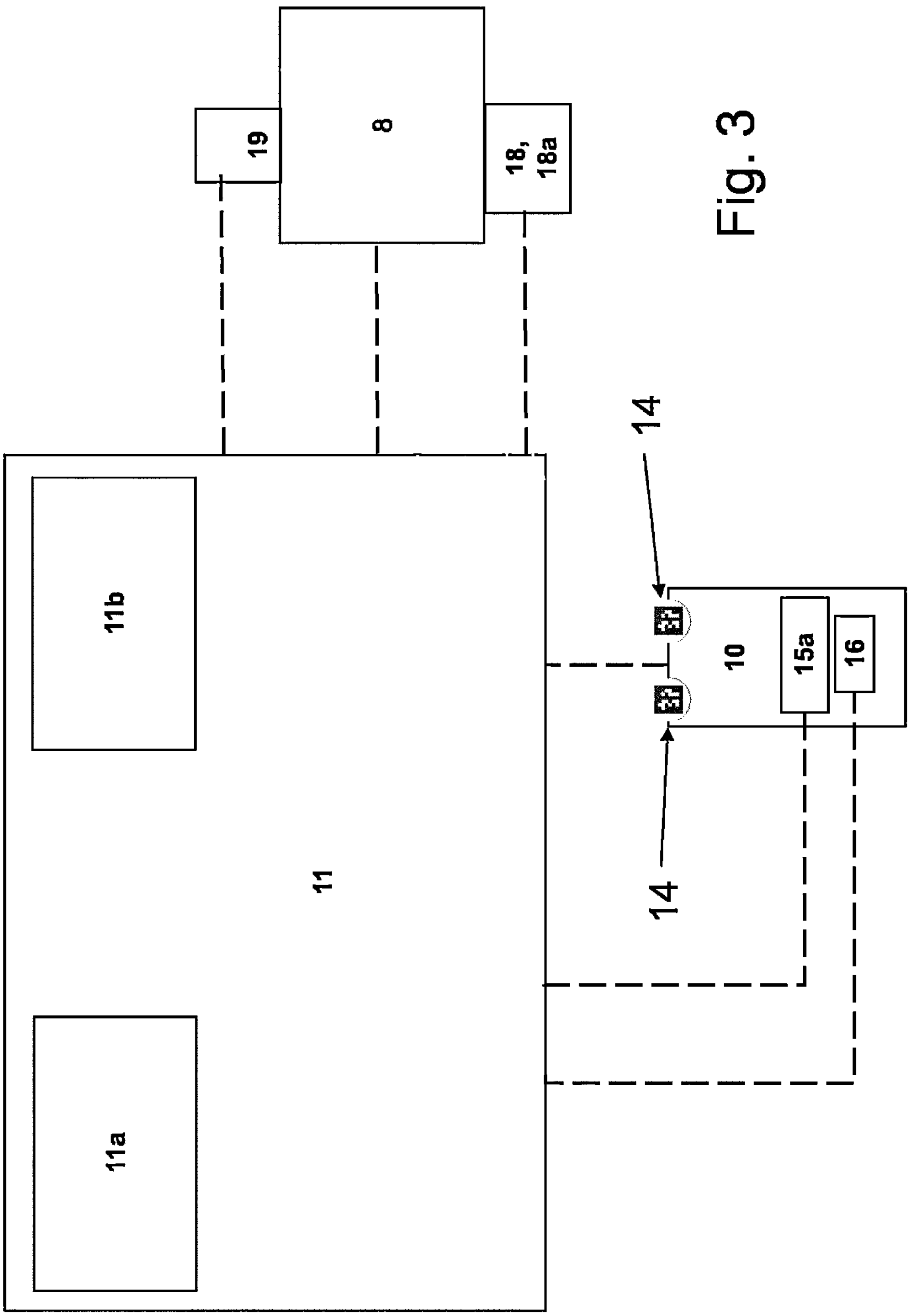

An exemplary embodiment of the invention is explained in more detail with reference to the following description. In the figures:

FIG. 1 is a perspective view of a load-handling crane according to the invention in a schematic representation, FIG. 2*a* is a view of a handling device of the crane of FIG. 1, FIG. 2*b* is a view of an alternative handling device for the crane of FIG. 1, and FIG. 3 is a schematic representation of control components of the crane of FIG. 1.

FIG. 1 shows a load-handling crane 1 in a perspective view. By way of example, the crane 1 is shown as a single-girder bridge crane with a crane girder 2 designed as a trussed girder. The crane 1 as a whole can be moved in a crane travel direction x on rails (not shown) by means of crane carriages 5, 6, which are secured to opposite ends 3, 4 of the crane girder 2 forming a crane bridge. The rails are usually arranged high above the floor and may for this purpose, for example, be elevated via a suitable supporting structure or be secured to opposing building walls and/or to a building ceiling, which then serve as a supporting structure.

Of course, alternative designs, which are not shown in detail here, are also conceivable for the crane 1, in particular the crane girder 2 and the rails. For example, the crane 1 can be designed as a suspension crane. In the case of a suspension crane, both the rails and the crane girder 2 can be formed by rail profiles, which generally have a C-shaped cross-section which is open downward in their installation position. In the installation position, the crane bridge formed by the crane girder 2 is in this case suspended via the crane carriages 5, 6 on the rails suspended, for example, from a building ceiling serving as a supporting structure, wherein the crane carriages 5, 6 are inserted into the rail profiles from below and can move within the rail profiles on crane tracks formed there. The following statements regarding the present crane 1 apply accordingly to a load-handling crane designed as a suspension crane.

The crane girder 2 extends with its longitudinal extent LE horizontally and transversely, in particular at right angles, to the crane travel direction x. The crane 1 or its crane girder 2 can be moved in the crane travel direction x via the crane carriages 5, 6 driven by a motorized crane drive. The crane drive preferably comprises an electric motor 5*a* or 6*a* for each of the two crane carriages 5, 6. A crane trolley 7 with a hoist 8 is arranged on the crane girder 2 and can be moved by means of its trolley carriage 7*a* driven by a motorized trolley drive, together with the hoist 8 on the crane girder 2 along its longitudinal extent LE and thus transversely, in particular at right angles, to the crane travel direction x in a trolley travel direction y. The trolley drive preferably also comprises an electric motor. In the case of a suspension crane, the crane trolley 7 with its trolley carriage 7*a* can be moved within the crane rail 2 on a trolley track there in the same way as the crane carriages 5, 6 within the corresponding rail on the crane track.

The travel drives of the crane 1 thus comprise the carriages 5, 6 and 7*a* and their motorized drives. By specifically controlling the crane drive and/or the trolley drive, the crane trolley 7 and thus the hoist 8 can be moved in a motorized manner in a travel direction on and parallel to a preferably horizontal travel plane E. The travel direction thus corresponds to the crane travel direction x or the trolley travel direction y or their superposition.

A flexible and strand-shaped load-bearing means 9 of the hoist 8 or its portion hanging down from the travel plane E as well as a load-carrying means 9*a* secured thereto and thus suspended, with a load L optionally attached to the load-carrying means 9*a*, can be lifted or lowered via a lifting drive of the hoist 8, which lifting drive is in particular motorized by means of an electric motor. In addition to the exemplary design as a rope in FIG. 1, the load-bearing means 9 may also be designed as a chain as shown in FIGS. 2*a* and 2*b*, so that the hoist 8 in this case is not designed as a rope hoist but as a chain hoist. The load-carrying means 9*a* comprises, by way of example, a load hook and is secured to and suspended from the load-bearing means 9 and thus the load strand, in particular via a handling device 10 secured to the load-bearing means 9 in a load-bearing manner in the load strand. As a result, the crane 1 is designed as a load-handling crane 1 in the sense defined at the beginning.

The load-bearing connection between the load-carrying means 9*a* and the handling device 10 for securing the load-carrying means 9*a* to the load-bearing means is preferably a rotationally fixed connection in order to be able to move and thus handle a load L particularly precisely by appropriate manipulation of the handling device 10. For this purpose, a handle 15 is arranged on a housing 12 of the handling device 10, which can be grasped by the operator 13 with one hand 13*a* in order, by means of a corresponding manual force, to be able to guide and align the load-bearing means 9 and thus the load strand including any load L and to dampen any pendulum movements thereof. The other hand 13*b* of the operator 13 may in this case be in direct contact with the load L and support the guiding and aligning or damping so that both hands 13*a*, 13*b* are available for this purpose, as is typical for load-handling cranes. In addition, the handling device 10 for operating the crane 1 is provided with an operating element 16 designed, for example, as a joystick (see FIG. 2*a*) and or is twisted thus designed as a control switch.

The crane 1 also comprises a controller 11, which is connected by control technology and in particular in a signal-transmitting manner both to the handling device 10 or its operating element 16 and to the travel drives and the lifting drive of the crane 1. When an operator 13 simultaneously actuates the operating element 16, in particular with the hand 13*a* grasping the handle 15, the controller 11 generates corresponding control commands for controlling the drives or the electric motors thereof, in particular independently of one another, so that the crane 1 can be operated in this way and the associated crane movements, in particular travel maneuvers on the travel plane E and lifting and lowering movements of the load-bearing means 9 perpendicular thereto, can be effected.

The controller 11 may be physically and/or functionally divided so that a part 11*a* of the controller 11 that serves to control the trolley drive and in particular also the lifting drive is arranged as a trolley control on the crane trolley 7, and a part 11*b* of the controller 11 that serves to control the crane drive is arranged as a crane control outside the crane trolley 7 on the crane girder 2 or at least one of the carriages 5, 6. Alternatively, the controller 11 may also be accommodated with at least both parts 11*a* and 11*b* in the handling device 10 or the housing 12 thereof and from there control both the lifting drive and the corresponding travel drive (crane drive or trolley drive) (not shown).

In order to be able to control the crane 1, in particular its hoist 8, according to the method according to the invention and accordingly to be able to move it intuitively, safely and efficiently in a desired travel direction on the travel plane E by means of its travel drives, the crane 1 is provided with a sensor system 18, which has an optical sensor 18*a* designed as a camera for ascertaining position data of a part secured to the load-bearing means 9. According to the invention, at least one marking element, which is designed by way of example as a 2D code 14 in the sense defined above and has a predefined and unique identification feature in the sense defined above, is provided as such a part. In the present exemplary embodiment, by way of example, two 2D codes 14 in the form of an AprilTag each are attached as marking elements to the handling device 10 (see also FIGS. 2*a* and 2*b*), in particular on a housing top side 12*a* of the housing 12 of the handling device 10. Instead of the corresponding 2D code 14 or AprilTag, one or more other marking element (s) may also be used within the scope of the present invention. The 2D codes 14 are detected and analyzed by the sensor system 18 to ascertain the position data. The controller 11 is connected to the sensor system 18 in a signal-transmitting manner and is configured to specify a travel direction for a control command, generated by the controller 11, for the corresponding travel drive, i.e., the trolley drive and/or the crane drive, of the crane 1 on the basis of the position data ascertained by the sensor system 18. The operating element 16 interacts with the sensor system 18 via a signal-transmitting connection (see FIG. 3) in such a way that, by actuating the operating element 16, a control command for controlling the corresponding travel drive with a direction target value representing the specified travel direction can be generated. By means of the control command, the hoist 8 can then be moved in a corresponding travel direction on the travel plane E by means of the corresponding travel drive, wherein the travel direction depends on the 2D codes detected by means of the sensor system 18 and their subsequently ascertained position data.

The sensor system 18 shown schematically in FIG. 1 ascertains position data of the corresponding 2D code 14, which can be changed and thus adjusted, by way of example, by a deflection-free rotation R of the handling device 10 about a rotation axis z. For this purpose, the operator 13 can grasp the handling device 10, for example at the handle 15, with one hand 13*a* and effect the desired rotation R with a rotation angle W by means of a corresponding manual force. The rotation axis z is an axis, in particular longitudinal axis, of the handling device 10, which extends in the direction of the gravitational force in the illustrated gravity-driven rest position and thus coincides with an imaginary vertical axis. Accordingly, the load-bearing means 9, to which the handling device 10 and also the load-carrying means 9*a*, in particular via the handling device 10, are secured, is also in the gravity-driven rest position. In this context, in the rest position shown, the load-bearing means 9 itself can also be twisted according to the rotation R about the rotation axis z. However, since this entails an increased manual effort for the operator 13 in order to compensate for a reverse torque resulting from the torsion of the load-bearing means, the handling device 10 is preferably rotated relative to the load-bearing means 9. For this purpose, the handling device 10 is secured to the load-bearing means 9, in particular together and uniformly with the load-carrying means 9*a* and any load L secured thereto, by means of a rotating element 17 (see FIGS. 2*a* and 2*b*) integrated in the housing 12 in particular below the housing top side 12*a*, so as to be rotatable relative to said load-bearing means about the rotation axis z. The load-bearing means 9 itself is not twisted around the rotation axis z or is twisted at most to a negligible extent.

FIG. 2*a* shows the handling device 10 of FIG. 1, suspended on the load-bearing means 9, in a schematic side view in more detail. It is shown that the handling device 10 is coupled via its rotating element 17 to the load-bearing means 9. Opposite the rotating element 17, the handling device 10 or its housing 12 has a receptacle 10*a* for securing the load-carrying means 9*a*, in particular in a rotationally fixed manner. The rotating element 17 connects the handling device 10 to the load-bearing means 9 in a load-bearing manner. This makes it possible, in particular, to transfer the weight of the load L via the handling device 10 and to introduce it from the rotating element 17 of said handling device into the load-bearing means 9. The operating element 16 is arranged on the housing 12, in particular on the handle 15 there.

It can also be seen that the handle 15 is designed to be encompassed at least partially by a hand 13*a*, 13*b* of the operator 13 and at the same time to make it possible for the same hand 13*a*, 13*b* to reach the operating element 16. The handle 15 may also be used as a lever arm to conveniently rotate the handling device 10 together with an attached load L (see FIG. 1) about the rotation axis z. For this purpose, the handle 15 is rod-shaped and arranged between two parallel holding arms 15*b*, of which only the front one is shown in the view of FIG. 2*a*. The handle 15 extends substantially horizontally between the holding arms 15*b*. The lever arm in relation to the rotation axis z is thus realized by the holding arms 15*b* since they space the handle 15*b* accordingly from the rotation axis z. In addition, the handling device 10 has a hand recognition sensor 15*a* integrated into the handle 15, in order to recognize the presence of an operator.

Also shown schematically is the arrangement of the sensor system 18 with its optical sensor 18*a*, which is by way of example attached to the hoist 8 above the two 2D codes 14 attached to the handling device 10. Also arranged by way of example on the hoist 8 is the load sensor system 19, which ascertains the current load in order to activate the light-duty travel function and/or the heavy-duty travel function. The load sensor system 19 may also comprise a load sensor, which is arranged in the load strand, in particular on the load-bearing means 9 itself or in or on the housing 12 of the handling device 10.

FIG. 2*b* shows a view of an alternative handling device 10 for the crane 1 of FIG. 1. In comparison to the handling device 10 of FIG. 2*a*, the handle 15, in particular with the integrated hand recognition sensor 15*a*, in FIG. 2*b* extends vertically and encloses the rotation axis z. The lever arm according to FIG. 2*b* is thus smaller than in FIG. 2*a* due to the missing holding arms 15*b* and the resulting smaller distance of the operator's hand from the rotation axis z.

The operating element 16, which is designed as a joystick in FIG. 2*a* by way of example, is concealed in FIG. 2*b* and can also be designed as a joystick or as a button here. Alternatively, the handling device 10 in both FIGS. 2*a* and 2*b* can also be designed entirely without an operating element 16 or can only have an operating element for the lifting drive, but none for the travel drives.

Both FIGS. 2*a* and 2*b* show the position of the rotating element 17 below the housing top side 12*a* and in particular within the housing 12. In contrast to FIG. 2*a*, however, the marking elements in the form of 2D codes 14 in FIG. 2*b* are not attached directly to the housing top side 12*a* but rather to a separate, flat and ring-shaped holding part 12*b*, which is connected above the housing 12 in a rotationally fixed manner to the housing 12 or the housing top side 12*a*. Such a holding part 12*b* for the at least one marking element may be provided independently of the design of the handling device 10, the handle 15 and the operating element 16.

Furthermore, in FIG. 2*b*, the same parts as in FIG. 2*a* are provided with the same reference signs and the statements in this respect apply accordingly to both handling devices 10.

FIG. 3 shows a schematic representation of control components of the crane 1. Shown are in particular components required for the invention, such as the controller 11, the part 11*a* thereof serving as a trolley control for controlling the trolley drive and in particular also the lifting drive, and the part 11*b* thereof serving as a crane control for controlling the crane drive, the sensor system 18 with an optical sensor 18*a*, designed as a camera by way of example, for ascertaining the position data of the 2D codes 14, as well as the components possibly required for the optional embodiments of the invention, such as an operating element 16 of the handling device 10, which is thus designed as a control switch, the hand recognition sensor 15*a* and the load sensor system 19. In addition, dashed lines show signal-transmitting connections of the components mentioned, in particular to the controller 11, which ensures the transmission of signals, which correspond at least to the ascertained position data, the target values mentioned, in particular the travel directions specified in each case as target values, and/or speed target values, and/or control commands with such target values for the travel drive and lifting drive.

Within the scope of the present invention, the load-handling crane 1 can now, for example, be controlled according to the following scenarios.

In a scenario a), which corresponds to the "rotation" operating mode or the heavy-duty travel function, above a predefined load value of, for example, 20 kg, the operator can rotate the handling device 10, designed as a control switch, into the desired travel direction with a deflection-free rotation R in the above sense. The control command for the travel drive can subsequently be generated by actuating the operating element 16, which is, for example, designed as a joystick, and is then converted into a corresponding travel movement in the desired travel direction since the sensor system 18 ascertains the rotation R from at least one of the 2D codes 14 in the form of corresponding position data, and the controller 11, which is connected to the sensor system 18 in a signal-transmitting manner, generates the control command with a correspondingly specified travel direction and thus on the basis of the ascertained position data. This also implements the aforementioned steering function, wherein the speed of the travel drive can also be controlled via the joystick.

In a scenario b), which corresponds to the "deflection" operating mode or the light-duty travel function, below a predefined load value of, for example, 20 kg, the operator only has to pull or push the handling device 10, designed as a control switch, into the desired travel direction, wherein no deflection-free rotation R in the above sense is required or no steering function is activated as in the heavy-duty travel function. Here too, the desired travel direction is recorded via the sensor system 18 by means of a corresponding position change of at least one 2D code 14 and is converted by the controller 11 into a corresponding control command, wherein the speed depends on the extent of the position change or the position data ascertained for this purpose.

In both scenarios, the specified travel direction can be changed "on the fly" during ongoing operation, i.e., during ongoing travel movements and without stopping the corresponding travel drive, by means of a corresponding position change.

LIST OF REFERENCE SIGNS

1 Load-handling crane
2 Crane girder
3 End
4 End
5 Crane carriage
5*a* Electric motor
6 Crane carriage
6*a* Electric motor
7 Crane trolley
7*a* Trolley carriage
8 Hoist
9 Load-bearing means
9*a* Load-carrying means
10 Handling device
10*a* Receptacle
11 Controller
11*a* Part of the controller 11
11*b* Part of the controller 11
12 Housing
12*a* Housing top side
12*b* Holding part
13 Operator
13*a* Hand
13*b* Hand
14 2D code
15 Handle
15*a* Hand recognition sensor
15*b* Holding arm
16 Operating element
17 Rotating element
18 Sensor system
18*a* Optical sensor
19 Load sensor system
E Travel plane
X Crane travel direction
Y Trolley travel direction
L Load
LE Longitudinal extent
R Rotation
W Rotation angle
Z Rotation axis

The invention claimed is:

1. A method for controlling a load-handling crane, the load-handling crane having a load-bearing means and a handling device for an operator secured to the load-bearing means, the load-handling crane having a travel drive, the travel drive comprising a trolley drive and/or a crane drive, said method comprising:

providing a sensor system;

ascertaining with the sensor system position data of a part secured to the load-bearing means;

providing a controller and connecting the controller to the sensor system in a signal-transmitting manner;

generating with the controller a control command and specifying, based on the position data ascertained by the sensor system, a travel direction for the control command, for the travel drive of the load-handling crane;

providing at least one marking element attached to the handling device, the marking element having a predefined, unique, identification feature; and detecting with the sensing system the marking element in order to ascertain the position data and the predefined unique identification feature of the marking element; and analyzing the marking element to unambiguously identify the marking element.

2. The method according to claim 1, wherein said providing at least one marking elements includes providing a at least one passive marking element or at least one active marking element.

3. The method according to claim 1, further comprising providing the handling device with a hand recognition sensor, sensing with the hand recognition sensor the presence of an operator, and wherein said generating the control command is generated and/or converted into a travel movement of the crane-only if, in particular not until, the hand recognition sensor of the handling device senses the presence of an operator.

4. The method according to claim 1, wherein said specifying the travel direction for the control command is specified and/or changed in response to detecting a position change of the marking element, and the position data ascertained for this purpose.

5. The method according to claim 1, wherein the handling device of the load-handling crane includes an operating element, and wherein said specifying the travel direction for the control command is achieved by actuating the operating element of the handling device.

6. The method according to claim 1, wherein said ascertaining with the sensor system includes continuously ascertaining the position data and continuously changing the specified travel direction during travel movement of the corresponding travel drive on the basis of the ascertained position data, in particular during the travel movement and without stopping the corresponding travel drive.

7. The method according to claim 1, wherein said generating the control command for the corresponding travel drive is generated according to a "deflection" operating mode of the crane based on a position change of the at least one detected marking element and the position data ascertained for this purpose, and said generating the control command includes specifying and/or changing a speed target value for the corresponding travel drive, which is dependent on the position data ascertained for the position change, in particular on the dimension of a deflection angle or a movement amplitude in the direction of a crane travel direction and/or trolley travel direction.

8. The method according to claim 7, wherein the handling device of the load-handling crane includes an operating element, wherein said generating the control command for the corresponding travel drive in a "rotation" operating mode of the crane is achieved by actuating the operating element of the handling device, without having to additionally effect a position change of the at least one marking element or ascertain corresponding position data for this purpose, and said specifying includes specifying a speed target value for the travel drive by actuating the operating element.

9. The method according to claim 8, further comprising exclusively activating the "rotation" operating mode and/or the "deflection" operating mode for predefined applications, which can preferably be defined by parameterization or by predefined load ranges, wherein the "rotation" operating mode can preferably be activated in the sense of a heavy-duty travel function for loads above a predefined load value and the "deflection" operating mode can preferably be activated in the sense of a light-duty travel function for loads below the predefined load value, and further comprising providing a load sensor system in communication with the controller, and ascertaining with the load sensor system the current load in order for the controller to activate the light-duty travel function and/or the heavy-duty travel function.

10. A load-handling crane comprising:

a travel drive, the travel drive comprising a trolley drive and/or a crane drive;

a load-bearing means;

a handling device for an operator secured to the load-bearing means;

a sensor system for ascertaining position data of a part secured to the load-bearing means;

a controller is connected to the sensor system in a signal-transmitting manner and configured to specify, on the basis of the position data ascertained by means of the sensor system, a travel direction for a control command, generatable by the controller; and at least one marking element attached to the load-bearing means, said at least one marking element having at least one predefined unique, identification feature in order to be detected by the sensor system in order to ascertain the position data, and wherein the sensor system and/or the controller are configured to analyze the at least one predefined identification feature of the marking element that has been detected, in particular to perform a method according to claim 1.

11. The method according to claim 8, further comprising activating the "rotation" operating mode and/or the "deflection" operating mode exclusively for predefined applications, which can preferable be defined by parameterization or by predefined load ranges, wherein the "rotation" operating mode can preferably be activated in the sense of a heavy-duty travel function for loads above a predefined load value and the "deflection" operating mode can preferably be activated in the sense of a light-duty travel function for loads below the predefined load value, and wherein the load-handling crane includes a load sensor system, and ascertaining-with the load sensor system the current load in order to activate the light-duty travel function and/or the heavy-duty travel function.

12. The method according to claim 2, wherein said generating the control command for the corresponding travel drive includes generating or converting the control command into a travel movement of the crane only if, in particular not until, a hand recognition sensor of the handling device recognizes at least the presence of an operator.

13. The method according to claim 2, wherein said providing at least one passive marking element comprises providing at least one passive marking element in the form of a 2D code, or providing at least one active marking element comprises preferably providing at least one active marking element in the form of a transmitter emitting infrared radiation.

14. The method according to claim 1, wherein said providing at least one marking elements comprises providing at least two marking elements.

* * * * *